US009525628B2

(12) United States Patent
Liu et al.

(10) Patent No.: US 9,525,628 B2
(45) Date of Patent: Dec. 20, 2016

(54) PACKET FORWARDING METHOD AND SYSTEM

(71) Applicant: Huawei Technologies Co., Ltd., Shenzhen (CN)

(72) Inventors: Shuming Liu, Nanjing (CN); Qinfeng Gu, Nanjing (CN); Qingbo Yu, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 99 days.

(21) Appl. No.: 14/567,798

(22) Filed: Dec. 11, 2014

(65) Prior Publication Data
US 2015/0188815 A1    Jul. 2, 2015

(30) Foreign Application Priority Data
Dec. 26, 2013 (CN) .......................... 2013 1 0731880

(51) Int. Cl.
*H04L 12/741* (2013.01)
*H04L 12/56* (2006.01)
(Continued)

(52) U.S. Cl.
CPC ......... *H04L 45/741* (2013.01); *H04L 12/4633* (2013.01); *H04L 45/566* (2013.01);
(Continued)

(58) Field of Classification Search
CPC .. H04L 45/741; H04L 45/745; H04L 12/4633; H04L 45/566; H04L 45/66; H04L 2212/00
See application file for complete search history.

(56) References Cited

U.S. PATENT DOCUMENTS

2006/0153193 A1    7/2006 Kim et al.
2011/0075667 A1    3/2011 Li et al.
(Continued)

FOREIGN PATENT DOCUMENTS

JP      2006108732 A     4/2006
KR      100636271 B1    10/2006
(Continued)

OTHER PUBLICATIONS

Partial English Translation and Abstract of Japanese Patent Application No. JP2006108732, Part 1, Jan. 21, 2016, 3 pages.
(Continued)

*Primary Examiner* — Omar Ghowrwal
(74) *Attorney, Agent, or Firm* — Conley Rose, P.C.

(57) ABSTRACT

A packet forwarding method and system. A first network device encapsulates a to-be-forwarded packet as a first packet, and sends the first packet to a second network device, where the first packet carries a destination Media Access Control (MAC) address encapsulation instruction, the destination MAC address encapsulation instruction is used to instruct the second network device to encapsulate a destination MAC address for the first packet, the to-be-forwarded packet carries a destination internet protocol (IP) address, and the destination MAC address is a MAC address of a destination host corresponding to the destination IP address; the second network device generates a second packet containing the destination MAC address according to the destination MAC address encapsulation instruction carried by the received first packet, and forwards the second packet to the destination host corresponding to the destination MAC address.

10 Claims, 4 Drawing Sheets

(51) Int. Cl.
*H04L 12/46* (2006.01)
*H04L 12/721* (2013.01)

(52) U.S. Cl.
CPC ............ *H04L 45/66* (2013.01); *H04L 45/745* (2013.01); *H04L 2212/00* (2013.01)

(56) References Cited

U.S. PATENT DOCUMENTS

| | | | | |
|---|---|---|---|---|
| 2012/0014387 | A1* | 1/2012 | Dunbar | H04L 12/4625 370/395.53 |
| 2012/0127996 | A1 | 5/2012 | Grosser et al. | |
| 2013/0148663 | A1 | 6/2013 | Xiong | |
| 2013/0301642 | A1* | 11/2013 | Radhakrishnan | H04L 45/66 370/392 |
| 2013/0322453 | A1 | 12/2013 | Allan | |
| 2015/0124817 | A1* | 5/2015 | Merchant | H04L 61/103 370/392 |

FOREIGN PATENT DOCUMENTS

| | | | |
|---|---|---|---|
| KR | 20080058382 | A | 6/2008 |
| KR | 1038811 | B1 | 5/2011 |
| KR | 1093973 | B1 | 12/2011 |
| WO | 2007033238 | A2 | 3/2007 |

OTHER PUBLICATIONS

Partial English Translation and Abstract of Japanese Patent Application No. JP2006108732, Part 2, Jan. 21, 2016, 14 pages.
Foreign Communication From a Counterpart Application, Japanese Application No. 2014255960, Japanese Office Action dated Oct. 27, 2015, 3 pages.
Foreign Communication From a Counterpart Application, Japanese Application No. 2014255960, English Translation of Japanese Office Action dated Oct. 27, 2015, 4 pages.
Foreign Communication From a Counterpart Application, Korean Application No. 10-2014-0188297, Korean Notice of Allowance dated Jan. 14, 2016, 3 pages.
Foreign Communication From a Counterpart Application, European Application No. 14197948.4, Extended European Search Report dated Apr. 15, 2015, 7 pages.
Foreign Communication From a Counterpart Application, European Application No. 14197948.4, Extended European Search Report dated Feb. 8, 2016, 4 pages.
Information Sciences Institute, "Internet Protocol, DARPA Internet Program, Protocol Specification," RFC 791, Sep. 1981, 50 pages.
Touch, J., "Updated Specification of the IPv4 ID Field," IETF, RFC 6864, Feb. 2013, 19 pages.
"IEEE Standards for Local and Metropolitan Area Networks: Virtual Bridged Local Area Networks," IEEE Standard 802.1Q-1998, Dec. 8, 1998, 211 pages.
"IEEE Standard for Local and Metropolitan Area Networks: Overview and Architecture," IEEE Computer Society, IEEE Standard 802®-2001, Mar. 8, 2002, 47 pages.

\* cited by examiner

PACKET FORWARDING METHOD AND SYSTEM

CROSS-REFERENCE TO RELATED APPLICATION

This application claims priority to Chinese Patent Application No. 201310731880.5, filed on Dec. 26, 2013, which is hereby incorporated by reference in its entirety.

TECHNICAL FIELD

The present invention relates to the communications field, and in particular, to a packet forwarding method and system.

BACKGROUND

After receiving a packet that needs to be forwarded, a gateway device needs to encapsulate the packet and then forwards the encapsulated packet. A packet encapsulation operation includes searching, using a routing prefix table and according to a destination Internet Protocol (IP) address of the packet, for an available next hop table, and then encapsulating a source Media Access Control (MAC) address, a destination MAC address, and next hop interface information for the packet using the next hop table.

The next hop table in the gateway device is used to encapsulate a designated destination MAC address for the packet, that is, to process a packet that carries a destination IP address corresponding to the designated destination MAC address. Therefore, when the gateway device is connected to multiple hosts, a corresponding number of next hop tables are required to implement packet encapsulation and forwarding.

A capacity for a next hop table to process packets at the same time is limited, and when the number of packets that carry a destination IP address corresponding to a designated destination MAC address and need to be processed by a gateway device exceeds a capacity of a next hop table used to encapsulate the designated destination MAC address, an excess part of packets cannot be encapsulated because of overflowing next hop table, thereby resulting in a forwarding failure. A method in the prior art leads to poor packet forwarding reliability and a low processing capability of the gateway device.

SUMMARY

Embodiments of the present invention provide a packet forwarding method and system, so as to solve a problem in the prior art. When the number of packets that carry a destination IP address corresponding to a designated destination MAC address and need to be processed by a gateway device exceeds a capacity of a next hop table used to encapsulate the designated destination MAC address, an excess part of packets cannot be encapsulated because of overflowing next hop table, thereby resulting in a forwarding failure, and leading to poor packet forwarding reliability and a low processing capability of the gateway device.

To solve the foregoing technical problems, a first aspect of the present invention provides a packet forwarding method, where the method includes encapsulating, by a first network device, a to-be-forwarded packet as a first packet, and sending the first packet to a second network device, where the first packet carries a destination MAC address encapsulation instruction, the destination MAC address encapsulation instruction is used to instruct the second network device to encapsulate a destination MAC address for the first packet, the to-be-forwarded packet carries a destination IP address, and the destination MAC address is a MAC address of a destination host corresponding to the destination IP address; generating, by the second network device, a second packet containing the destination MAC address according to the destination MAC address encapsulation instruction carried by the received first packet; and forwarding, by the second network device, the second packet to the destination host corresponding to the destination MAC address.

A second aspect of the present invention provides a packet forwarding system, including a first network device configured to encapsulate a to-be-forwarded packet as a first packet, and send the first packet to a second network device, where the first packet carries a destination MAC address encapsulation instruction, the destination MAC address encapsulation instruction is used to instruct the second network device to encapsulate a destination MAC address for the first packet, the to-be-forwarded packet carries a destination IP address, and the destination MAC address is a MAC address of a destination host corresponding to the destination IP address; and a second network device configured to, and generate a second packet containing the destination MAC address according to the destination MAC address encapsulation instruction carried by the received first packet; and further configured to forward the second packet to the destination host corresponding to the destination MAC address.

According to the present invention, after receiving a to-be-forwarded packet, a first network device encapsulates the packet and designates for the packet, a second network device configured to add a destination MAC address of the packet, so that the destination MAC address is added for the packet by the second network device, thereby increasing hardware resource utilization, and improving packet forwarding working reliability and a network device processing capability.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
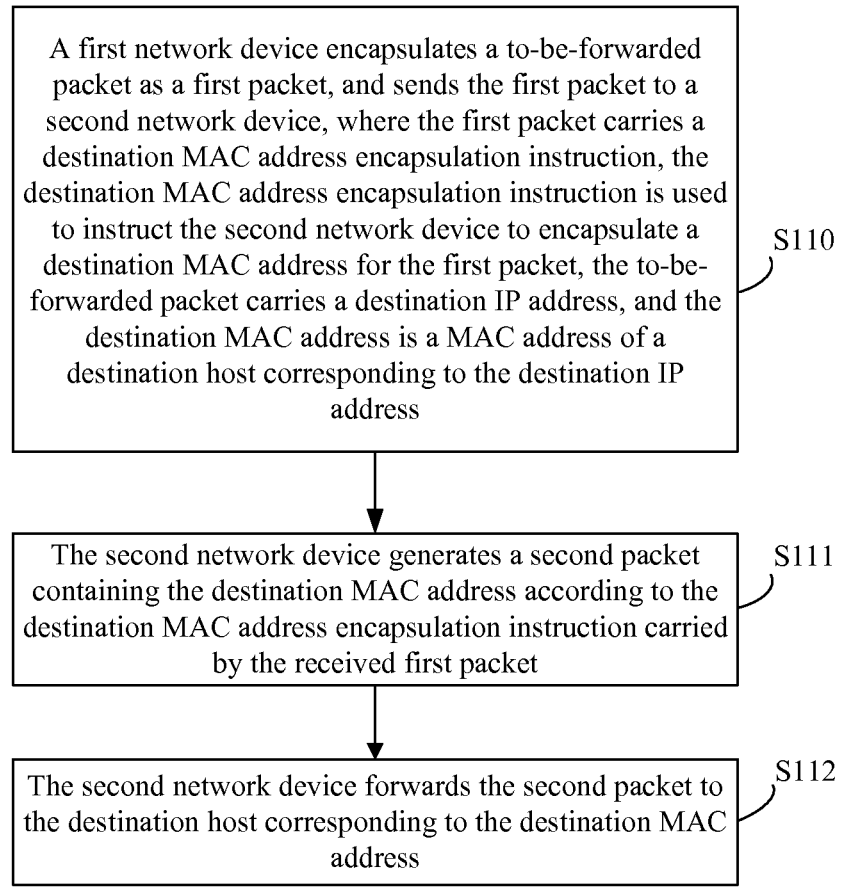
FIG. 1 is a schematic flowchart of a packet forwarding method according to an embodiment of the present invention.

FIG. 1 is a flowchart of a packet forwarding method according to an embodiment of the present invention. The method may be applicable to a packet forwarding operation between inter-network devices. In an actual application, a network device as a gateway needs to encapsulate a to-be-forwarded packet, and then forwards the packet to a destination host in a routing forwarding manner. A method in the prior art is used to perform forwarding, which leads to a problem. The number of packets that carry a destination IP address corresponding to a designated destination MAC address exceeds a capacity of a next hop table used to encapsulate the designated destination MAC address, an excess part of packets cannot be encapsulated because of overflowing a next hop table, thereby resulting in a forwarding failure. Therefore, the packet forwarding operation between inter-network devices may be processed using the method shown in FIG. 1. As shown in FIG. 1, the method in this embodiment of the present invention may include the following steps:

Step S110: A first network device encapsulates a to-be-forwarded packet as a first packet, and sends the first packet to a second network device, where the first packet carries a destination MAC address encapsulation instruction, the destination MAC address encapsulation instruction is used to instruct the second network device to encapsulate a destination MAC address for the first packet, the to-be-forwarded packet carries a destination IP address, and the destination MAC address is a MAC address of a destination host corresponding to the foregoing destination IP address.

The first network device mainly completes initial encapsulation of the packet, and designates the second network device that is configured to add the destination MAC address for the generated first packet. In specific implementation, the encapsulating, by a first network device, a to-be-forwarded packet as a first packet, and sending the first packet to a second network device may include receiving, by the first network device, the to-be-forwarded packet, where the packet carries the destination IP address; obtaining the destination IP address; searching for first next hop table information corresponding to the destination IP address; encapsulating a destination MAC address encapsulation instruction, information about an interface connecting to the second network device, and a MAC address of the second network device that are in the first next hop table information into the packet, generating the first packet carrying the destination MAC address encapsulation instruction; and sending, using an interface corresponding to the information that is about the interface connecting to the second network device and is in the first packet, the first packet to the second network device.

In specific implementation, because the to-be-forwarded packet received by the first network device carries the destination IP address, an available first next hop table may be searched for according to the destination IP address. The first next hop table found in this embodiment of the present invention contains the MAC address of the second network device, the information about the interface connecting to the second network device, and the destination MAC address encapsulation instruction. The first next hop table further contains other encapsulation information. Further and optionally, a method for searching for the available first next hop table may use a manner of using routing prefix table and refer to a structure example, shown in Table 1, of a routing prefix table:

TABLE 1

Prefix
VRF
Nexthop Index

Prefix is an IP address of the destination host in a network, Nexthop Index is a first next hop table index. After the routing prefix table is searched for according to the destination IP address of the packet and a corresponding routing prefix table is found, the first next hop table is obtained using the next hop index in the table, and reference may be made to a structure example, shown in Table 2, of a first next hop table:

TABLE 2

Index
Source MAC
Vlan
Interface2
Destination MAC2
MAC address
encapsulation instruction Interface2 is an interface of the second network device that generates the first packet, Destination MAC2 is a MAC address of the second network device of a next hop. When the information about the interface connecting to the second network device is encapsulated for the packet and the first packet is sent using the interface of the second network device, it means enabling the second network device to encapsulate the destination MAC address for the first packet according to the destination MAC address encapsulation instruction.

In specific implementation, after the to-be-forwarded packet is encapsulated using the foregoing first next hop table and the first packet is generated, the first network device in this embodiment of the present invention sends, using the interface corresponding to the information that is about the interface connecting to the second network device and is in the first packet, the first packet to the second network device, and designates the second network device to add the destination MAC address for the first packet.

A communication connection relationship is kept between the first network device and the second network device in this embodiment of the present invention. The second network device configured to encapsulate the destination MAC address may be designated using a routing prefix table for a to-be-encapsulated packet, and another encapsulation operation is performed by the second network device, so as to eventually generate a complete second packet. Therefore, the first network device in this embodiment of the present invention stores address information and interface information of the second network device in the first next hop table, so that information encapsulation may be performed on all packets corresponding to different destination MAC addresses using the first next hop table, and processing efficiency of a to-be-forwarded packet is improved by increasing an applicable scope of the first next hop table.

Step S111: The second network device generates a second packet containing the destination MAC address according to the destination MAC address encapsulation instruction carried by the received first packet. The second network device is configured to add the destination MAC address for the packet. Therefore, after the first packet is received, an encapsulation operation needs to be performed on the destination MAC address of the first packet according to the destination MAC address encapsulation instruction, which is implemented according to the following steps: the second network device receives the first packet sent by the first network device, where the first packet carries the destination IP address; adds the destination MAC address for the first packet, and generates the second packet containing the destination MAC address according to the destination MAC address encapsulation instruction.

In specific implementation, that the second network device adds the destination MAC address for the first packet, and generates the second packet containing the destination MAC address is implemented by constructing a new prefix table and a second next hop table. A structure example, shown in Table 3, of a prefix table is as follows:

TABLE 3

Destination IP
Nexthop Index

Destination IP is the destination IP address, Nexthop Index is a second next hop table index. After the prefix table is searched for according to the destination IP address of the first packet and the corresponding prefix table is found, the second next hop table is obtained using the next hop index in the table, and reference may be made to a structure example, shown in Table 4, of the second next hop table:

TABLE 4

Interface
Destination MAC

Interface is a next hop routing interface of the generated second packet. Destination MAC is the destination MAC address of the destination host.

After receiving the first packet, the second network device first obtains the destination IP address of the first packet, searches for an available second next hop table according to the destination IP address using the prefix table, and then encapsulates the destination MAC address and next hop routing interface information into the first packet according to the second next hop table and generates the second packet.

The second next hop table in the second network device in this embodiment of the present invention stores the destination MAC address that is used for destination MAC address encapsulation of a to-be-encapsulated packet, and the next hop routing interface information, and is used to cooperate with the first next hop table of the first network device, so as to solve an encapsulation failure problem of an excess part of packets due to a limited capacity of a next hop table.

Step S112: The second network device forwards the second packet to the destination host corresponding to the destination MAC address. In step S111, by means of information encapsulation of the second network device, the second packet generated by the second network device contains the next hop routing interface information. In this step, the second packet is forwarded, using an interface corresponding to the next hop routing interface information contained in the second packet, to the destination host corresponding to the destination MAC address.

In the method in this embodiment of the present invention, a first encapsulation operation performed by a first network device for a to-be-forwarded packet may include a general encapsulation operation of network information, source address information, and the like, and an operation of designating a second network device configured to add a destination MAC address. The second network device is controlled by the first network device, and performs a second encapsulation operation, such as adding a corresponding destination MAC address and information alike for a packet designated by the first network device. Therefore, when there are a great number of connected hosts, the method in this embodiment of the present invention can avoid a case in which to-be-forwarded packets exceed a capacity of a next hop table and overflow the next hop table, and improve effectiveness of a packet forwarding operation.

Communication transmission between the first network device and the second network device may be implemented using a shared transmission protocol, where an existing transmission protocol may be used, and a new transmission protocol may also be constructed according to a network device attribute and a transmission information feature, which is not limited in this embodiment of the present invention.

Both the first network device and the second network device in this embodiment of the present invention may have a capability of directly encapsulating a destination MAC address for a to-be-forwarded packet using a next hop table. In this embodiment of the present invention, that packet encapsulation work is implemented in manners of layer 2 encapsulation and layer 3 forwarding should not be understood to be a limitation to technical solutions of the present invention. The method may collaborate with the implementation solution of the embodiment shown in FIG. 1 of the present invention, thereby partially reducing resource consumption of a gateway device.

After receiving a to-be-forwarded packet, a first network device in this embodiment encapsulates the packet and designates for the packet, a second network device configured to add a destination MAC address of the packet, so that the destination MAC address is added for the packet by the second network device, thereby increasing hardware resource utilization, and improving packet forwarding working reliability and a network device processing capability.

Figure 2:
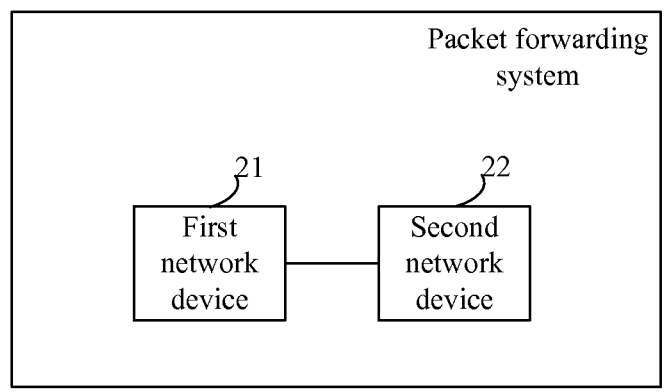
FIG. 2 is a schematic structural diagram of a packet forwarding system according to an embodiment of the present invention.

FIG. 2 is a schematic structural diagram of a packet forwarding system according to an embodiment of the present invention. The packet forwarding system in this embodiment of the present invention is capable of executing the method shown in FIG. 1. As shown in FIG. 2, the packet forwarding system in this embodiment of the present invention may include at least a first network device 21 and a second network device 22.

The first network device 21 is configured to encapsulate a to-be-forwarded packet as a first packet, and send the first packet to the second network device 22, where the first packet carries a destination MAC address encapsulation instruction, the destination MAC address encapsulation instruction is used to instruct the second network device to encapsulate a destination MAC address for the first packet, and the to-be-forwarded packet carries a destination IP address, and the destination MAC address is a MAC address of a destination host corresponding to the destination IP address. The first network device mainly completes initial encapsulation of the packet, and designates the second network device 22 that is configured to add the destination MAC address for the generated first packet.

The second network device 22 is configured to generate a second packet containing the destination MAC address according to the destination MAC address encapsulation instruction carried by the received first packet; and further configured to forward the second packet to the destination host corresponding to the destination MAC address.

Figure 3:
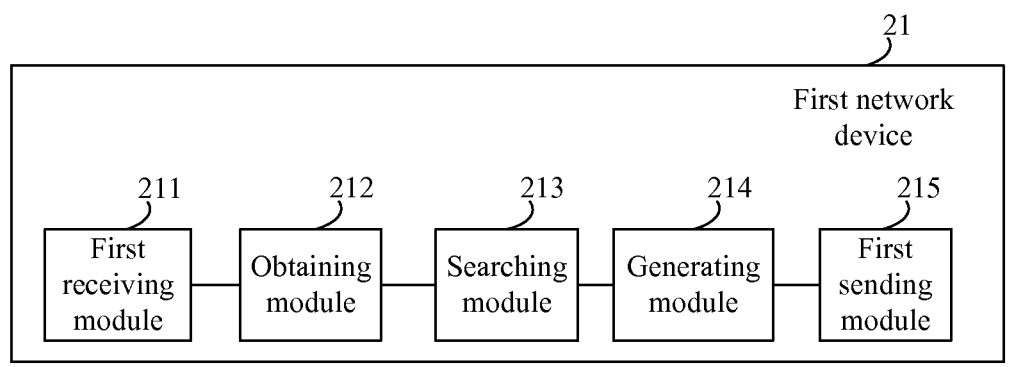
FIG. 3 is a schematic structural diagram of a first network device in the system of FIG. 2.

Further and optionally, referring to the first network device 21 shown in FIG. 3, the first network device 21 may implement first encapsulation of the to-be-forwarded packet using a first receiving module 211, an obtaining module 212, a searching module 213, a generating module 214, and a first sending module 215.

The first receiving module 211 is configured to receive the to-be-forwarded packet, where the packet carries the destination IP address.

The obtaining module 212 is configured to obtain the destination IP address from the packet.

The searching module 213 is configured to search for first next hop table information corresponding to the destination IP address obtained by the obtaining module 212, where the first next hop table information includes the destination MAC address encapsulation instruction, information about an interface connecting to the second network device, and a MAC address of the second network device.

The generating module 214 is configured to encapsulate the destination MAC address encapsulation instruction, the information about the interface connecting to the second network device, and the MAC address of the second network device that are in the first next hop table information and found by the searching module 213 into the packet, and generate the first packet carrying the destination MAC address encapsulation instruction.

The first sending module 215 is further configured to send, using an interface corresponding to the information that is about the interface connecting to the second network device and is in the first packet, the first packet to the second network device 22.

Figure 4:
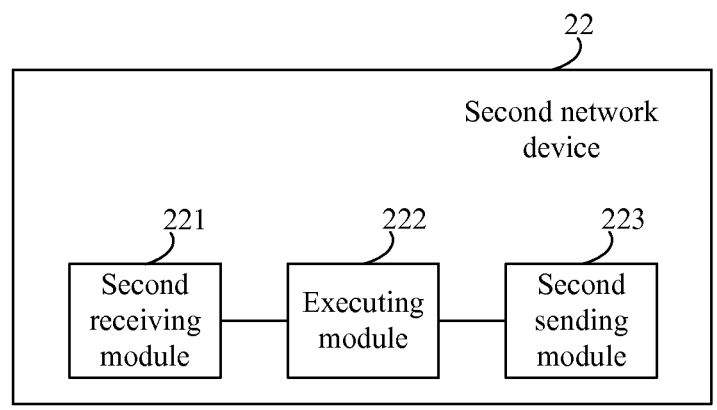
FIG. 4 is a schematic structural diagram of a second network device in the system of FIG. 2.

Further and optionally, referring to the second network device 22 shown in FIG. 4, the second network device 22 may implement an operation of adding the destination MAC address of the first packet using a second receiving module 221, an executing module 222, and a second sending module 223.

The second receiving module 221 is configured to receive the first packet sent by the first network device 21, where the first packet carries the destination IP address.

The executing module 222 is configured to add the destination MAC address for the first packet, and generate the second packet containing the destination MAC address according to the destination MAC address encapsulation instruction.

Figure 5:
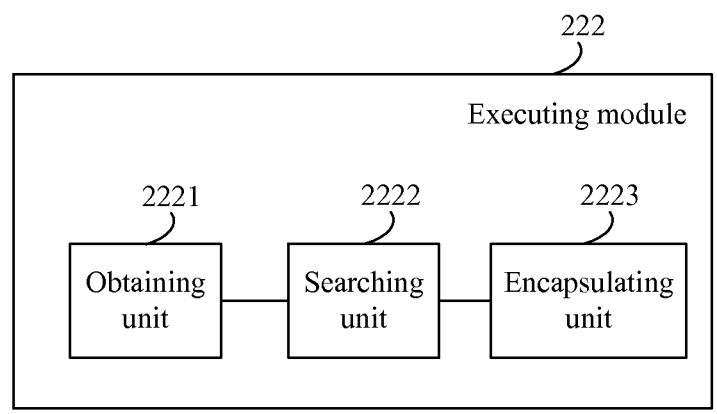
FIG. 5 is a schematic structural diagram of an executing module of the second network device shown in FIG. 4.

Referring to FIG. 5, the executing module 222 of the second network device 22 may further include an obtaining unit 2221 configured to obtain the destination IP address from the first packet; a searching unit 2222 configured to search for second next hop table information corresponding to the destination IP address, where the second next hop table information includes the destination MAC address and next hop routing interface information; and an encapsulating unit 2223 configured to encapsulate the destination MAC address and the next hop routing interface information into the first packet using a second next hop table found by the searching unit 2222, and generate the second packet containing the destination MAC address.

Correspondingly, the second sending module 223 of the second network device 22 is configured to forward, using an interface corresponding to the next hop routing interface information contained in the second packet, the second packet to the destination host corresponding to the destination MAC address.

The first network device used in this embodiment of the present invention may be a gateway. A communication connection relationship is kept between the gateway and the second network device, the second network device configured to encapsulate the destination MAC address may be designated for a to-be-encapsulated packet using a routing prefix table, and another encapsulation operation is performed by the second network device, so as to eventually generate a complete second packet. Therefore, the first network device in this embodiment of the present invention stores address information and interface information of the second network device in a first next hop table, so that information encapsulation may be performed on all packets corresponding to different destination MAC addresses using the first next hop table, and processing efficiency of a to-be-forwarded packet is improved by increasing an applicable scope of the first next hop table.

The second network device used in this embodiment of the present invention may be a top of rack (TOR) switch. A second next hop table in the TOR switch stores a destination MAC address and next hop routing interface information that are used for destination MAC address encapsulation of a to-be-encapsulated packet, and is used to cooperate with the first next hop table of the first network device, so as to solve an encapsulation failure problem of an excess part of packets due to a limited capacity of the next hop table.

In the system in this embodiment of the present invention, a first encapsulation operation performed by a first network device for a to-be-forwarded packet may include a general encapsulation operation of network information, source address information, and the like, and an operation of designating a second network device configured to add a destination MAC address. The second network device is controlled by the first network device, and performs a second encapsulation operation, such as adding a corresponding destination MAC address and information alike for a packet designated by the first network device. Therefore, when there are a great number of connected hosts, the method in this embodiment of the present invention can avoid a case in which to-be-forwarded packets exceed a capacity of a next hop table and overflow the next hop table, and improve effectiveness of a packet forwarding operation.

In the system in this embodiment of the present invention, communication transmission between the first network device and the second network device may be implemented using a shared transmission protocol, where an existing transmission protocol may be used, and a new transmission protocol may be constructed according to a network device attribute and a transmission information feature, which is not limited in this embodiment of the present invention.

In the system in this embodiment of the present invention, both the first network device and the second network device may have a capability of directly encapsulating the destination MAC address for a to-be-forwarded packet using a next hop table. In the system in this embodiment of the present invention, that packet encapsulation working is implemented in manners of layer 2 encapsulation and layer 3 forwarding should not be understood to be a limitation to technical solutions of the present invention.

In addition, the system in this embodiment of the present invention may further include a connected host, when the second network device connected to the connected host is a TOR switch, the TOR switch may snoop ARP information of the connected host using an ARP Snooping method to perform next hop information encapsulation. In addition, when an ARP packet from a user is sent to the network device by the TOR switch, source MAC of the ARP packet is filled with a MAC address of the TOR switch, and a MAC address, learned by a gateway, in next hop information is the MAC address of the TOR switch.

In the system of this embodiment of the present invention, after receiving a to-be-forwarded packet, a first network device encapsulates the packet and designates for the packet, a second network device configured to add a destination MAC address of the packet, so that the destination MAC address is added for the packet by the second network device, thereby increasing hardware resource utilization, and improving packet forwarding working reliability and a network device processing capability.

Further and optionally, an embodiment of the present invention provides a network device, and a schematic structural diagram of the network device is shown in FIG. 3. The network device may be a gateway and a first encapsulation operation performed by the network device for a to-be-forwarded packet may include a general encapsulation operation of network information, source address information, and the like, and an operation of designating another network device configured to add a destination MAC address, and the network device enables the designated network device to perform a second encapsulation operation, such as adding a corresponding destination MAC address and information alike for a packet designated by a first network device. Therefore, when there are a great number of connected hosts, the network device provided in this embodiment of the present invention can avoid a phenomenon that a packet overflows a next hop table, thereby increasing hardware resource utilization of a device, and improving effectiveness of packet encapsulation and a forwarding operation.

Further and optionally, an embodiment of the present invention provides a network device. A schematic structural diagram of a network device is shown in FIG. 4 to FIG. 5, the network device may be a TOR switch which is controlled by a main control network device, and performs a second encapsulation operation, such as adding a corresponding destination MAC address and information alike for a packet designated by the main control network device. Therefore, when there are a great number of connected hosts, the network device in this embodiment of the present invention can reduce packet processing pressure of a main control network device, and improve effectiveness of a packet forwarding operation and a processing capability of the network device.

Figure 6:
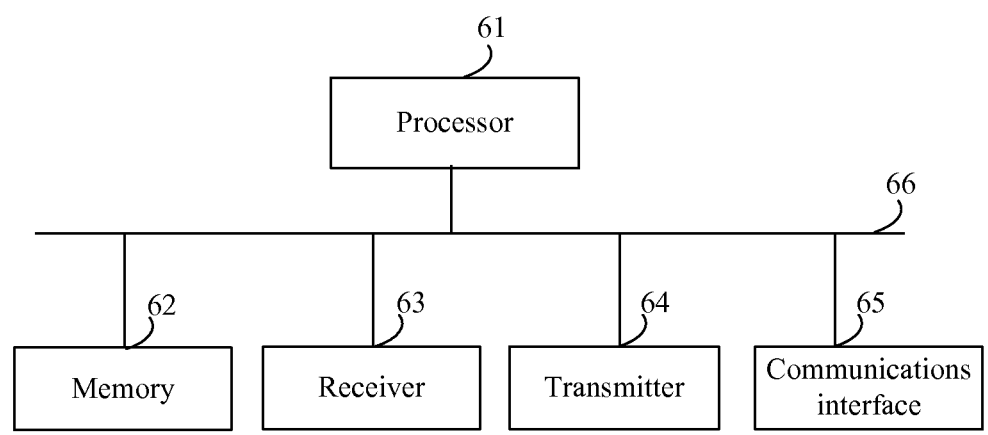
FIG. 6 is a schematic structural diagram of a network device according to an embodiment of the present invention.

FIG. 6 is a schematic structural diagram of a network device according to an embodiment of the present invention. The method shown in FIG. 1 may be implemented in the network device, and the network device in this embodiment may include a processor 61, a memory 62, a receiver 63, a transmitter 64, and a communications interface 65.

The receiver 63 is connected to the processor 61, and is configured to receive a to-be-forwarded packet, where the packet carries a destination IP address.

The processor 61 is configured to obtain the destination IP address from the packet; is further configured to search for first next hop table information corresponding to the obtained destination IP address, where the first next hop table information includes a destination MAC address encapsulation instruction, information about an interface connecting to a second network device, and a MAC address of the second network device; and is further configured to encapsulate the destination MAC address encapsulation instruction, the information about the interface connecting to the second network device, and the MAC address of the second network device into the packet, and generate a first packet carrying the destination MAC address encapsulation instruction, and generate the first packet carrying the destination MAC address encapsulation instruction.

The transmitter 64 is connected to the processor 61, and is configured to send, using an interface corresponding to the information that is about the interface connecting to the second network device and is in the first packet, the first packet to the second network device.

The memory 62 is configured to store a cache file during a processing process of the processor 61.

The communications interface 65 is configured to communicate with an external device.

Further and optionally, the network device in this embodiment may include a bus 66. The processor 61, the memory 62, the receiver 63, and the transmitter 64 may be connected and communicate using the bus 66. The processor 61 may be a central processing unit (CPU), an application-specific integrated circuit (ASIC), and the like. The memory 62 may include an entity that has a storage function, such as a random access memory (RAM) and a read-only memory (ROM).

Figure 7:
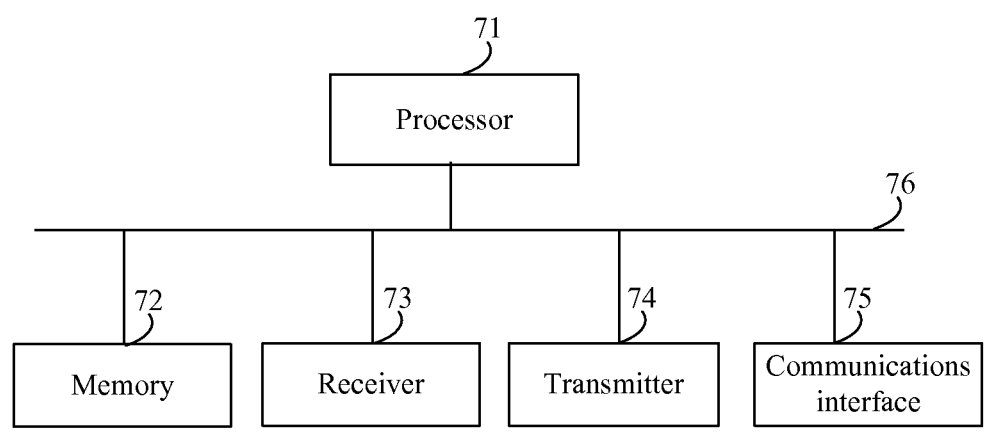
FIG. 7 is a schematic structural diagram of another network device according to an embodiment of the present invention.

FIG. 7 is a schematic structural diagram of another network device according to an embodiment of the present invention. The method shown in FIG. 1 may be implemented in the network device, and the network device in this embodiment may include a processor 71, a memory 72, a receiver 73, a transmitter 74, and a communications interface 75.

The receiver 73 is connected to the processor 71, and is configured to receive a first packet sent by a first network device, where the first packet carries a destination IP address.

The processor 71 is configured to generate a second packet containing the destination MAC address according to the destination MAC address encapsulation instruction, where the second packet contains the destination MAC address and next hop routing interface information.

The transmitter 74 is connected to the processor 71, and is configured to forward, using an interface corresponding to the next hop routing interface information contained in the second packet, the second packet to a destination host corresponding to the destination MAC address.

The memory 72 is configured to store a cache file during a processing process of the processor 71.

The communications interface 75 is configured to communicate with an external device.

Further and optionally, the network device in this embodiment may include a bus 76. The processor 71, the memory 72, the receiver 73, and the transmitter 74 may be connected and communicate using the bus 76. The processor 71 may be a CPU, an ASIC, and the like. The memory 72 may include an entity that has a storing function, such as a RAM and a ROM.

Based on the description of the foregoing implementation manner, a person skilled in the art may clearly understand that the present invention may be implemented by hardware, or firmware, or a combination of them.

What is disclosed above are merely exemplary embodiments of the present invention. However, the protection scope of the present invention is not limited thereto. Therefore, equivalent variations made according to the claims of the present invention shall fall within the scope of the present invention.

What is claimed is:

1. A packet forwarding method comprising:
encapsulating, by a gateway, a to-be-forwarded packet as a first packet;
sending, by the gateway, the first packet to a switch, wherein the first packet comprises a destination media access control (MAC) address encapsulation instruction, wherein the destination MAC address encapsulation instruction is used to instruct the switch to encapsulate a destination MAC address of a destination host for the first packet, wherein the to-be-forwarded packet comprises a destination Internet Protocol (IP) address of the destination host, wherein the destination MAC address is a MAC address of the destination host corresponding to the destination IP address, and wherein the first packet does not comprise the destination MAC address;
generating, by the switch, a second packet comprising the destination MAC address according to the destination MAC address encapsulation instruction included in the first packet; and
forwarding, by the switch, the second packet to the destination host corresponding to the destination MAC address.

2. The method according to claim 1, wherein encapsulating, by the gateway, the to-be-forwarded packet as the first packet, and sending the first packet to the switch comprises:
receiving, by the gateway, the to-be-forwarded packet, wherein the to-be-forwarded packet comprises the destination IP address but does not comprise the destination MAC address;
obtaining, by the gateway, the destination IP address;
searching, by the gateway, for first next hop table information corresponding to the destination IP address, wherein the first next hop table information comprises the destination MAC address encapsulation instruction, information about an interface connecting to the switch, and a MAC address of the switch;
encapsulating the destination MAC address encapsulation instruction, the information about the interface connecting to the switch, and the MAC address of the switch into the packet;
generating the first packet comprising the destination MAC address encapsulation instruction; and
sending, using the interface corresponding to the information about the interface connecting to the switch and is included in the first packet, the first packet to the switch.

3. The method according to claim 1, wherein generating, by the switch, the second packet comprising the destination MAC address according to the destination MAC address encapsulation instruction included in the first packet comprises;
receiving, by the switch, the first packet sent by the gateway, wherein the first packet comprises the destination IP address but does not comprise the destination MAC address;
adding the destination MAC address to the first packet; and
generating the second packet comprising destination MAC address according to the destination MAC address encapsulation instruction.

4. The method according to claim 3, wherein adding the destination MAC address to the first packet, and generating the second packet comprising the destination MAC address according to the destination MAC address encapsulation instruction comprises:
obtaining the destination IP address from the first packet;
searching for second next hop table information corresponding to the destination IP address, wherein the second next hop table information comprises the destination MAC address and next hop routing interface information;
encapsulating the destination MAC address and the next hop routing interface information into the first packet; and
generating the second packet comprising the destination MAC address.

5. The method according to claim 4, wherein forwarding, by the switch, the second packet to the destination host corresponding to the destination MAC address comprises:
forwarding, using an interface corresponding to the next hop routing interface information included in the second packet, the second packet to the destination host corresponding to the destination MAC address.

6. A packet forwarding system comprising:
a switch; and
a gateway coupled to the switch and configured to:
encapsulate a to-be-forwarded packet as a first packet; and
send the first packet to the switch, wherein the first packet comprises a destination media access control (MAC) address encapsulation instruction, wherein the destination MAC address encapsulation instruction is used to instruct the switch to encapsulate a destination MAC address of a destination host for the first packet, wherein the to-be-forwarded packet comprises a destination Internet Protocol (IP) address of the destination host, wherein the destination MAC address is a MAC address of the destination host corresponding to the destination IP address, and wherein the first packet does not carry the destination MAC address, and
wherein the switch is configured to:
generate a second packet comprising the destination MAC address according to the destination MAC address encapsulation instruction included in the first packet; and
forward the second packet to the destination host corresponding to the destination MAC address.

7. The system according to claim 6, wherein the gateway is further configured to:
receive the to-be-forwarded packet, wherein the to-be-forwarded packet comprises the destination IP address but does not comprise the destination MAC address;
obtain the destination IP address from the packet;
search for first next hop table information corresponding to the destination IP address obtained by the obtaining module, wherein the first next hop table information comprises the destination MAC address encapsulation instruction, information about an interface connecting to the switch, and a MAC address of the switch;
encapsulate the destination MAC address encapsulation instruction, the information about the interface connecting to the switch, and the MAC address of the switch into the packet; and
generate the first packet comprising the destination MAC address encapsulation instruction; and send, by using the interface corresponding to the information that is about the interface connecting to the switch and is included in the first packet, the first packet to the switch.

8. The system according to claim 6, wherein the switch is further configured to:
receive the first packet sent by the gateway, wherein the first packet comprises the destination IP address but does not comprise the destination MAC address; and
add the destination MAC address to the first packet; and
generate the second packet comprising the destination MAC address according to the destination MAC address encapsulation instruction.

9. The system according to claim 8, wherein the switch is further configures to:
obtain the destination IP address from the first packet;
search for second next hop table information corresponding to the destination IP address, wherein the second next hop table information comprises the destination MAC address and next hop routing interface information; and
encapsulate the destination MAC address and the next hop routing interface information into the first packet; and
generate the second packet comprising the destination MAC address.

10. The system according to claim 9, wherein the switch is further configured to forward, using an interface corresponding to the next hop routing interface information included in the second packet, the second packet to the destination host corresponding to the destination MAC address.

* * * * *

UNITED STATES PATENT AND TRADEMARK OFFICE
CERTIFICATE OF CORRECTION

PATENT NO. : 9,525,628 B2
APPLICATION NO. : 14/567798
DATED : December 20, 2016
INVENTOR(S) : Shuming Liu et al.

Page 1 of 1

It is certified that error appears in the above-identified patent and that said Letters Patent is hereby corrected as shown below:

In the Claims

Column 11, Line 65, Claim 3 should read: "generating the second packet comprising the destination"
Column 13, Line 15, Claim 9 should read: "further configured to"

Signed and Sealed this
Twenty-first Day of March, 2017

Michelle K. Lee
*Director of the United States Patent and Trademark Office*